(12) United States Patent
Miyazaki et al.

(10) Patent No.: US 9,236,028 B2
(45) Date of Patent: Jan. 12, 2016

(54) IMAGE DISPLAY APPARATUS

(71) Applicant: OLYMPUS CORPORATION, Tokyo (JP)

(72) Inventors: Kanto Miyazaki, Tokyo (JP); Takeshi Yamazaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 242 days.

(21) Appl. No.: 13/759,604

(22) Filed: Feb. 5, 2013

(65) Prior Publication Data
US 2013/0201227 A1  Aug. 8, 2013

(30) Foreign Application Priority Data

Feb. 6, 2012 (JP) ................... 2012-022886

(51) Int. Cl.
| | | |
|---|---|---|
| G09G 5/10 | (2006.01) | |
| G09G 3/00 | (2006.01) | |
| H04N 9/31 | (2006.01) | |
| G02B 26/08 | (2006.01) | |
| G02B 26/10 | (2006.01) | |
| G09G 3/34 | (2006.01) | |
| F21V 8/00 | (2006.01) | |

(52) U.S. Cl.
CPC .............. *G09G 5/10* (2013.01); *G02B 26/0841* (2013.01); *G02B 26/101* (2013.01); *G09G 3/001* (2013.01); *H04N 9/3129* (2013.01); *H04N 9/3152* (2013.01); *G02B 6/0053* (2013.01); *G09G 3/346* (2013.01); *G09G 2320/068* (2013.01)

(58) Field of Classification Search
CPC ............. G02B 26/0841; G02B 26/101; G02B 6/0053; G02B 6/00; G09G 2320/068; G09G 3/001; G09G 3/346; G09G 5/10; G09G 3/36; H04N 9/3129; H04N 9/3152
USPC .......... 345/7–8, 13–14, 87, 690, 697; 359/13, 359/17–19, 27–28, 265, 34, 196.1–204.4, 359/223.1
See application file for complete search history.

(56) References Cited

U.S. PATENT DOCUMENTS

| | | | | |
|---|---|---|---|---|
| 4,835,601 | A * | 5/1989 | Kobayashi | 348/196 |
| 2003/0011751 | A1* | 1/2003 | Sakata et al. | 353/30 |
| 2006/0033009 | A1* | 2/2006 | Kobayashi et al. | 250/208.1 |
| 2010/0046070 | A1* | 2/2010 | Mukawa | 359/480 |
| 2011/0013245 | A1* | 1/2011 | Tanaka et al. | 359/201.2 |
| 2011/0050655 | A1* | 3/2011 | Mukawa | 345/204 |
| 2011/0234619 | A1* | 9/2011 | Tokunaga | 345/589 |
| 2011/0273657 | A1* | 11/2011 | Collings et al. | 349/187 |
| 2012/0105432 | A1* | 5/2012 | Liao et al. | 345/419 |

FOREIGN PATENT DOCUMENTS

WO    2006/061927    6/2006

* cited by examiner

*Primary Examiner* — Hong Zhou
(74) *Attorney, Agent, or Firm* — Kenyon & Kenyon LLP

(57) ABSTRACT

The image display apparatus according to the invention is characterized by comprising a light source for emitting out parallel light, a light deflector capable of deflecting the parallel light emitted out from the light source, and a control unit operable to produce a scan signal for deflecting the light deflector periodically and produce a light intensity control signal in sync with the scan signal based on entered image information thereby controlling the light source.

9 Claims, 13 Drawing Sheets

ID_DISPLAY APPARATUS

IMAGE DISPLAY APPARATUS

BACKGROUND OF THE INVENTION AND RELATED ART STATEMENT

The present invention relates to an image display apparatus that enables a viewer to view images.

BACKGROUND ART

An image display apparatus making virtual images projected at infinity viewable has been known in the art. Patent Publication 1 discloses an image display apparatus capable of viewing such virtual images. Referring to this image display apparatus, light emitted out from a liquid crystal display device is propagated through a substrate so that the light exit out from an exit provided in the substrate to image light on the viewer's retina. As a result, the viewer may view the image.
Patent Publication 1: PCT 2006/061927 Pamphlet

SUMMARY OF THE INVENTION

The present invention provides an image display apparatus characterized by comprising:
a light source for emitting out parallel light,
a light deflector capable of deflecting the parallel light emitted out from said light source, and
a control unit operable to produce a scan signal for deflecting said light deflector periodically, and produce a light intensity control signal in sync with said scan signal based on entered image information thereby controlling said light source.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF PREFERRED EMBODIMENTS

Some embodiments according to a certain aspect of the invention will now be explained in details with reference to the accompanying drawings.

(First Embodiment)

Figure 1:
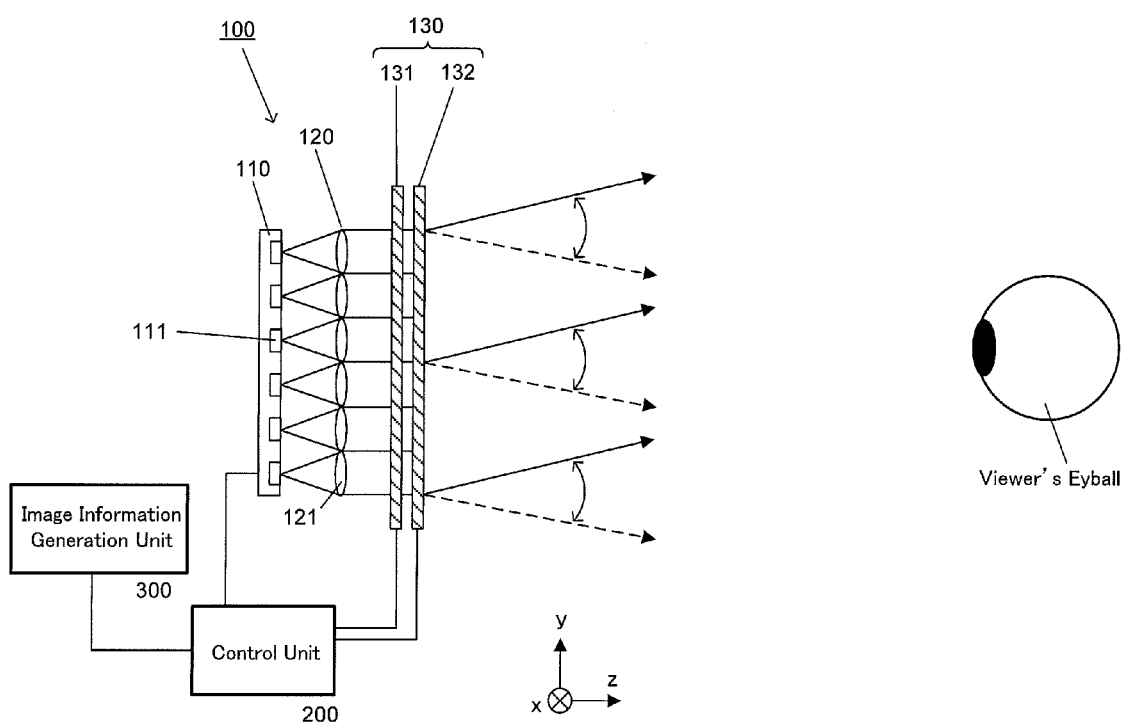
FIG. 1 is a sectional view of the arrangement of the image display apparatus according to the first embodiment of the invention.
Figure 2:
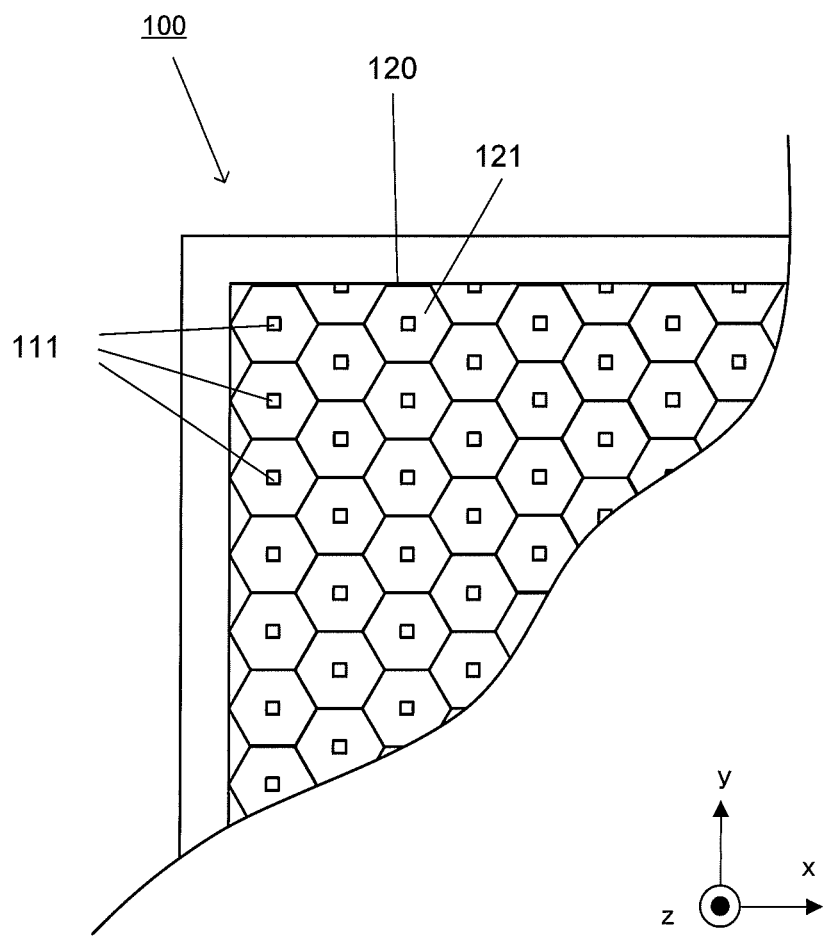
FIG. 2 is a front view of the arrangement of the image display apparatus according to the first embodiment of the invention.

FIGS. 1 and 2 are a sectional view and a (fragmentary) plan view, respectively, of the image display apparatus according to the first embodiment of the invention. The image display apparatus indicated generally by reference numeral 100 includes and comprises an LD (semiconductor laser) array 110, a lens array 120, a light deflector 130 and a control unit 200. The LD array 110 and lens array 120 function together as a light source for emitting out parallel light. In FIGS. 1 and 2, the x and y axes are taken such that a plane viewed by the viewer is defined by the xy plane, and the z axis is defined by an axis orthogonal to the xy plane.

In this first embodiment, LDs (semiconductor lasers) 111 are used as a diffuse light emitting source for emitting out diffuse light, and unit lenses 121 that form together the lens array 120 are used as an optical transformation device for transforming diffuse light emitted out from the LDs 111 into parallel light. As shown, one particular LD 111 matches with one particular unit lens 121, and the light emission point of each LD 111 is positioned at the back focus of the corresponding unit lens 121. This arrangement enables the diffuse light emitted out from the LD 111 is transformed by the unit lens 121 into parallel light that is in turn projected at infinity. As shown in FIG. 2, the unit lenses 121 should preferably be located proximately in the lens array 120 such that there is no gap between parallel light beams exiting out from adjacent unit lenses 121.

The light deflector 130 provides a means for deflecting parallel light exiting out from the respective unit lenses 121. Here two light deflector devices 131 and 132 having deflection in the y and x directions are used to deflect parallel light exiting out from the respective unit lenses 121. For instance, a light deflector device having such a metal-material structure as shown in JP(A) 2011-112942 may be used for the light deflector device 131, 132. This light deflector device is designed such that upon entrance of incident light on one surface, light is emitted out from the opposite surface at a deflection angle depending on an applied voltage. Variable applied voltages make it possible to vary the deflection angle.

The control unit 200 produces a scan signal to each light deflector device 131, 132. This scan signal controls each light deflector device 131, 132 such that the parallel light deflected by the unit lens 121 forms a two-dimensional image plane on the viewer's retina. It is here to be understood that various scan modes includes of raster scan may be used for scanning. Image information produced out from an image information generation unit 300 is entered in the control unit 200. The entered image information is transformed into a light intensity control signal in sync with the scan signal for entrance in each LD in the LD array 110. The same light intensity control signal is entered in each LD, and the respective LDs 111 are simultaneously flickered with the light intensity depending on the light intensity signal.

Figure 3:
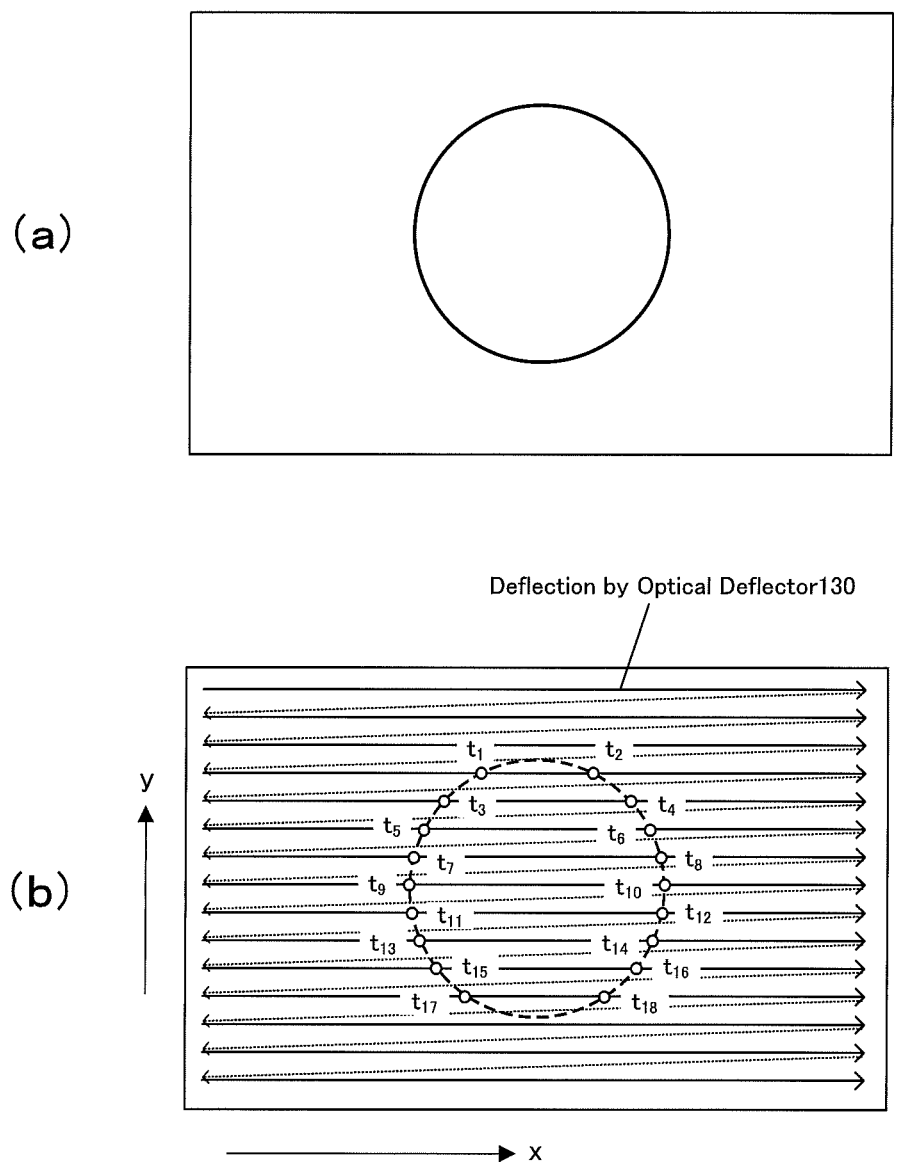
FIG. 3 is illustrative of the display principles of the image display apparatus according to the first embodiment of the invention.

FIG. 3 is illustrative of the display principles of the image display apparatus according to the first embodiment of the invention. FIG. 3(*a*) is illustrative of image information entered in the control unit 200. For simplification of illustration, reference is made to an image circled in the center of the screen. FIG. 3(*b*) is illustrative of how the direction of deflection moves in the screen and how the LDs 111 are flickered on the basis of scan signals. Such scans as indicated by solid lines in FIG. 3(*b*) are implemented by the light deflector device 132 for deflecting light in the x-axis direction and the light deflector device 131 for deflecting light in the y-axis direction. There is a raster scan mode shown, in which once one-dimensional scan is done in the x-axis direction, there is a shift down or up to the y-axis direction after which one-dimensional scan is again implemented in the x-axis direction.

During this scan operation, the LDs 111 emit out light at the contour of the circle of FIG. 3(*a*), that is, at times corresponding to t1 to t10, enabling the circle image to be formed as shown in FIG. 3(*b*). In this embodiment, the image is expressed by a binary value: light emission and shut-off; by producing a multistage light intensity control signal depending on the image information from the control unit 200, however, it is also possible to gain multistage control of the intensity of light emitted out from the LDs 111 and form multi-gradation images. It is thus possible to view gray-scale images.

When the thus formed image is projected onto the viewer's retina, it may be viewed as a virtual image formed at infinity, because of being formed by parallel light. With the image display apparatus according to this embodiment, it is possible to locate a plurality of light sources for emitting out parallel light within a plane (xy plane) that defines the viewer's field of view thereby extending a range of view and allowing the viewer to view clear images. That is, although the parallel light exiting out from each unit lens 121 imposes some limitation on the range of view because of its minute diameter, it is to be understood that if a plurality of light sources for emitting out parallel light are located within the xy plane as in this embodiment, the range of view can then be extended. Although parallel light exiting out from each unit lens 121 is going to form an image through the light deflector 130 on the viewer's retina, yet the viewer can view clear images because the same image is formed on the same position on the retina in an overlapping manner.

As can be seen from the principles explained with reference to FIG. 3, the resolution of this image display apparatus is determined by two factors: (1) the diameter of the spot imaged on the retina and (2) the angle resolution of the light deflector. In the first embodiment of the invention, it may be assumed that the light emitted out from the respective LDs 111 is mutually incoherent, and an optical system comprising the unit lenses 121 and the viewer's eye is a so-called diffraction limited optical system that is substantially free of aberrations and makes sure a resolving power represented by the formula of diffraction. Accordingly, the diameter of the spot imaged on the retina is determined by a geometric optics imaging magnification between the individual unit lenses 121 in the lens array 120 and the eye.

The size of the light emission point of each LD 111 is larger in the SLOW axis direction than in the FAST axis direction and about 2 μm in general. Now that the unit lenses 121 in the lens array 120 have a focal length of 3.2 mm and the eye has a focal length of approximately 16 mm, the imaging magnification becomes 5. Therefore, the light emission point of each LD 111 provides a spot of 10 μm in diameter on the retina or, in another parlance, an angle resolution of 2 minutes that is roughly half the human eye's resolution of approximately 1 minute. On the other hand, the light deflector 130 has an angle resolution of 1 minute smaller than the above resolution, making sure the image display apparatus has a resolution of 2 minutes.

Reference is then made to the number of pixels. Now that the range of the deflectable angle of the light deflector device 132 in the x-axis direction is ±10 degrees and the image display apparatus has an angle resolution of 2 minutes as mentioned above, the number of pixels is 2×10 degrees÷(2 minutes÷60 minutes)=600 pixels. On the other hand, now that the range of the deflectable angle of the light deflector device 131 in the y-axis direction is ±7.5 degrees, the image display apparatus has an angle resolution of 2 minutes and scan lines are 2 minutes apart in the y-axis direction, the number of pixels is 2×7.5 degrees÷(2 minutes÷60 minutes)=450 pixels.

The light deflector device 132 that implements scan in the x-axis direction implements sweep at 13.5 kHz, and the light deflector device 131 that implements scan in the y-axis direction implements sweep at 30 Hz, so the substantial refresh rate becomes 30 Hz.

Figure 4:
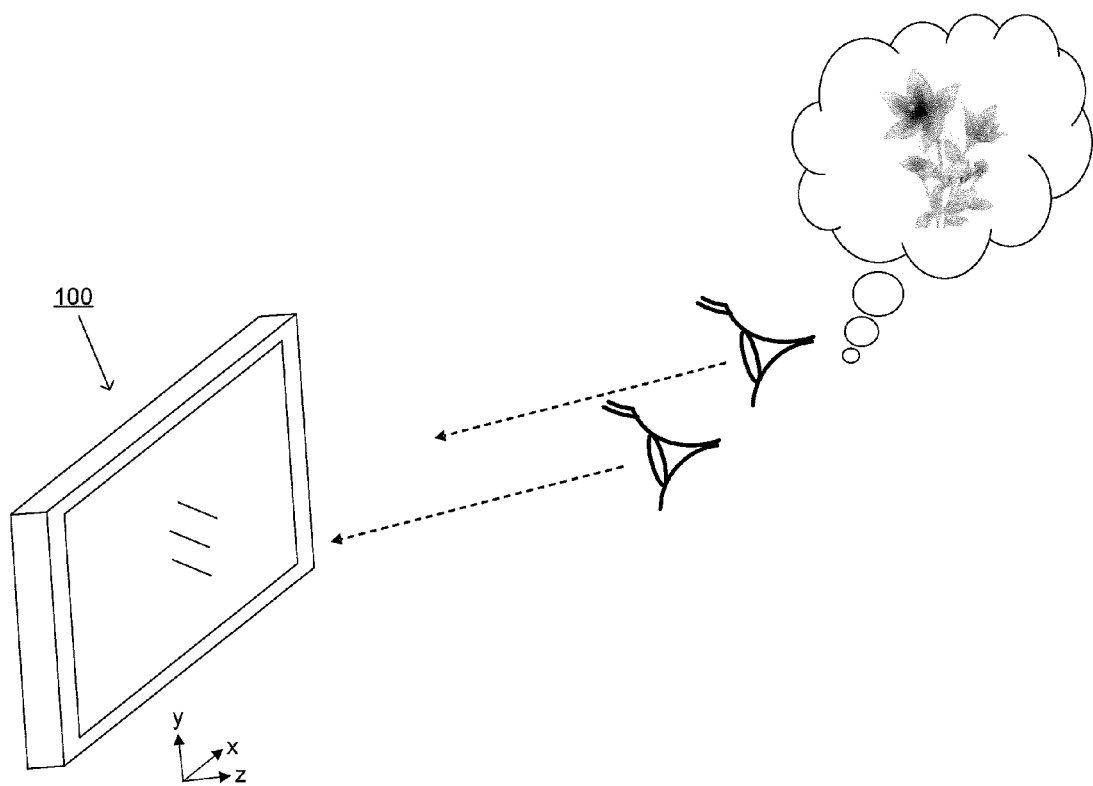
FIG. 4 is illustrative of how images are viewed through the image display apparatus according to the first embodiment of the invention.

FIG. 4 is illustrative of how images are viewed by the image display apparatus of the instant embodiment. It is possible for the viewer to view virtual images formed by the image display apparatus 100. With the image display apparatus according to the first embodiment of the invention explained so far, virtual images formed in the distance can be viewed; so even farsighted viewers can view clear images. Being constructed of minute optical elements such as LDs 111 and unit lenses 121, the instant image display apparatus can be reduced in terms of optical distances between optical elements, and can have a low-profile layout as well. In addition, it is possible to extend the viewable range through such simplified construction as comprising a two-dimensional arrangement of optical elements (within the xy plane).

Set out below are numeral data about the optical elements used in the first embodiment of the invention.
Pitch between unit lenses 121: 2.0 mm
Effective diameter of unit lens 121: 2.0 mm
Focal length of unit lens 121: 3.2 mm
NA on the light source side of unit lens 121: 0.31
Wavelength of LD 111: 640 nm
Size of the image display apparatus: 200 mm in the x-axis direction and 100 mm in the y-axis direction.

(Second Embodiment)

Although the first embodiment explained so far is based on the presumption that images are formed with monochrome light sources (having one wavelength), it is to be understood that color images may also be formed by use of multichrome light sources. The image display apparatus 100 according to the second embodiment of the invention is different from that of the first embodiment in that the light sources used are capable of emitting out parallel light in different colors. The second embodiment is otherwise similar to the first embodiment including the light deflector 130 or the like.

To this end, the light source includes a plurality of LEDs capable of emitting out diffuse light in different colors (wavelength bands). In the second embodiment of the invention, LEDs 114R, 114G and 114B having red, green and blue colors (wavelength bands), respectively, are located in positions corresponding to each unit lens 121. Specifically, three LEDs 114R 114G and 114B are arranged in the y-axis direction in substantially the back focus position of the unit lens 121, with the green LED 114G positioned on the optical axis of the unit lens 121. It is here to be noted that combinations of plural colors forming LEDs may optionally be selected not only from red, green and blue but also from other colors, if required.

Figure 5:
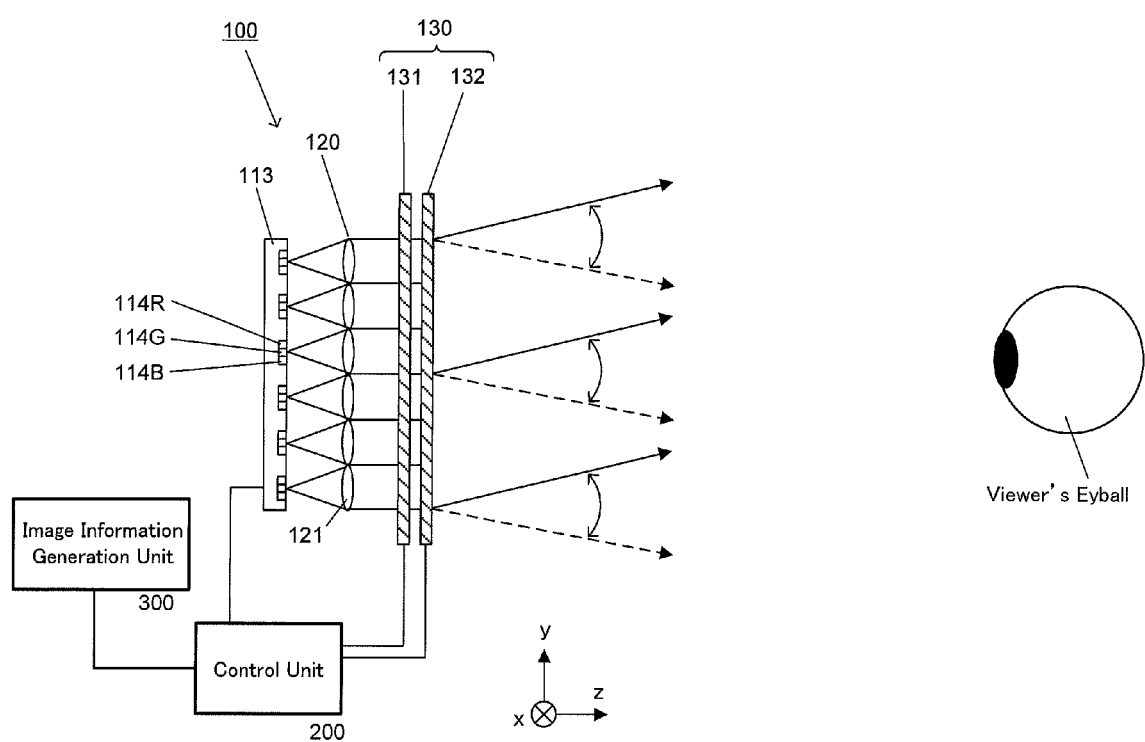
FIG. 5 is a sectional view of the arrangement of the image display apparatus according to the second embodiment of the invention.

In the second embodiment of the invention, the control unit 200 is operable to implement scan by the light deflector 130 and, at the same time, gain control of the light intensities of the LEDs 114R, 114G and 114B depending on entered image information, thereby forming color images. In this case, the LEDs 114R, 114G and 114B may emit out light at the same time. However, the LEDs 114R, 114G and 114B are located in different positions on the y-axis as also shown in FIG. 5, resulting in misalignments of images formed by the unit lenses 121 too.

To avoid misalignments of the imaging positions for the respective colors, the second embodiment of the invention is designed such that any one of the red, green and blue LEDs 114R, 114G and 114B emits out light, and the deflection angle of the light deflector 130 is corrected depending on the LED 114R, 114G, and 114B that is emitting out light.

Figure 6:
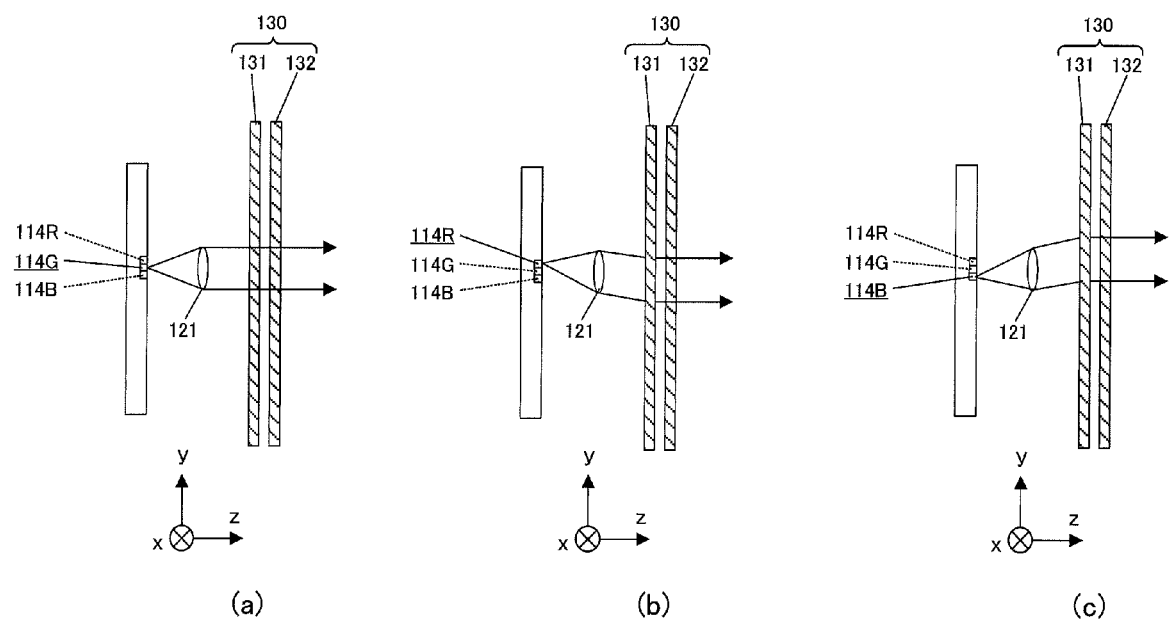
FIG. 6 is illustrative in schematic of how the image display apparatus according to the second embodiment is operated to enable LEDs in plural colors to emit out light.

FIG. 6 is illustrative in schematic of how the red, green and blue LEDs 114R, 114G and 114B are emitting out light. Here the red, green and blue LEDs 114R, 114G and 114B do not emit out light at the same time; in other words, they are going to emit out light in order. The red, green and blue LEDs 114R, 114G and 114B form an image in a given unit such as a screenful or one line of image, and once scan by the LEDs 114R, 114G and 114B in all colors is completed, there will be one image formed.

FIG. 6(a) is illustrative of the centrally positioned green LED 114G upon light emission. The light emission point of the green LED 114G is positioned on the optical axis of the unit lens 121, so that the light emitted out from the light emission point exits out from the unit lens 121 parallel with the optical axis, exiting out from the light deflector vertically.

FIG. 6(b) is illustrative of the red LED 114R upon light emission. The light emission point of the red LED 114R is positioned in the plus y-axis direction of the unit lens 121 with respect to its optical axis; so a light beam incident on the unit lens 121 will have a tilt in the y-axis direction. In order for the viewer to view an image in the same position as in FIG. 6(a), however, the light must exit out from the light deflector 130 vertically, as is the case with the green LED 114G. For this reason, when the red LED 114R is emitting out light, the light deflector device 131 in the y-axis direction is corrected for the deflection angle such that the parallel light obliquely incident in the y-axis direction exits out from the light deflector 130 vertically.

FIG. 6(c) is illustrative of the blue LED 114B upon light emission. The light emission point of the blue LED 114B is positioned in the minus y-axis direction of the unit lens 121 with respect to its optical axis; so a light beam incident on the unit lens 121 will have a tilt in the y-axis direction. For this reason, when the blue LED 114B emits out light as is the case with the red LED 114R, the light deflector device 131 in the y-axis direction is corrected for the deflection angle such that the parallel light obliquely incident in the y-axis direction goes out vertically to the light deflector 130.

While the vertical exit of light from the light deflector 130 has here been explained, it is to be understood that at other deflection angle, too, red, green and blue images may be formed in the same position if similar correction is applied to the light deflector 130. In the second embodiment of the invention, the red and blue LEDs 114R and 114B are corrected for the deflection angle on the basis of the green LED 114G positioned on the optical axis of the unit lens 121; however, the LEDs 114R, 114G and 114B to be corrected may optionally be determined depending on their locations or the like.

The parallel light exiting out from the unit lens 121 is deflected by the light deflector 130 to form a scanned image plane. In that case, the control unit 200 is operable to emit out light from the LEDs 114R, 114G and 114B depending on the entered image information, forming virtual images within the image plane depending on the image information.

In the second embodiment of the invention, it is thus possible for the viewer to view color virtual images by use of the multichrome LEDs 114R, 114G and 114B (having a plurality of wavelength bands). In that case, if misalignments of exit directions in association with the locations of the LEDs 114R, 114G and 114B are corrected by the light deflector 130, it is then possible to view images free from misalignments.

As is the case with the first embodiment of the invention, the resolution of the image display apparatus of the second embodiment is determined by two factors: (1) the diameter of the spot imaged on the retina and (2) the angle resolution of the light deflector. In the second embodiment of the invention, it may be assumed that an optical system comprising the unit lenses 121 and the viewer's eye is a so-called diffraction limited optical system. Accordingly, the diameter of the spot imaged on the retina is determined by a geometric optics imaging magnification between the individual unit lenses 121 and the eye.

The size of the light emission point of each LED 114R, 114G, and 114B is 10 μm in diameter. Now that the unit lens 121 has a focal length of 8 mm and the eye has a focal length of approximately 16 mm, the imaging magnification becomes 2. Therefore, the light emission point of each LED 114R, 114G, and 114B provides a spot of 20 μm in diameter on the retina or, in another parlance, an angle resolution of 4 minutes that is roughly one-fourths of the human eye's resolution of approximately 1 minute. On the other hand, the light deflector 130 has an angle resolution of 1 minute smaller than the above resolution, making sure the image display apparatus has a resolution of 4 minutes.

Reference is then made to the number of pixels. Now that the range of the deflectable angle of the light deflector device 132 in the x-axis direction is ±10 degrees and the image display apparatus has an angle resolution of 4 minutes as mentioned above, the number of pixels is 4×10 degrees÷(2 minutes÷60 minutes)=300 pixels. On the other hand, now that the range of the deflectable angle of the light deflector 130 in the y-axis direction is ±7.5 degrees, the image display apparatus has an angle resolution of the same 4 minutes as in the x-axis direction and scan lines are 4 minutes apart in the y-axis direction, the number of pixels is 4×7.5 degrees÷(2 minutes÷60 minutes)=225 pixels, and the number of lines is 225 too.

The workings of color displaying are now explained. The light deflector device 132 implementing scan in the x-axis direction performs sweep at 13.5 kHz, and the light deflector device 131 implementing scan in the y-axis direction performs a total of three scans corresponding to the sequential light emission of the green, red and blue LEDs per line. Each light deflector device performs sweep at 90 Hz. The red, green and blue LEDs 114R, 114G and 114B emit out light sequentially: any one of them emits out light. This makes sure a substantial refresh rate of 30 Hz. The sequential light-emission time span is so short that the red, green and blue of the LEDs 114R, 114G and 114B are perceived by the human eye in mixed colors.

It is here understood that when there is longitudinal chromatic aberration in the unit lens 121, the red, green and blue LEDs 114R, 114G and 114B may be shifted in the z-axis direction such that the red, green and blue light beams exiting out from the lens array 120 take the form of approximately parallel light, thereby correcting that aberration. When there is chromatic aberration of magnification in the unit lens 121, it is preferable to factor the chromatic aberration of magnification in the deflection angle by the light deflector 130, thereby correcting that aberration.

Set out below are numeral data about the optical elements used in the second embodiment of the invention.
Pitch between unit lenses 121: 2.0 mm
Effective diameter of unit lens 121: 2.0 mm
Focal length of unit lens 121: 8 mm
NA on the light source side of unit lens 121: 0.125
Wavelength of each LED 114: centering on 640 nm for red, centering on 550 nm for green, and centering on 450 nm for blue
Size of the image display apparatus: 200 mm in the x-axis direction and 100 mm in the y-axis direction.

(Third Embodiment)

Figure 7:
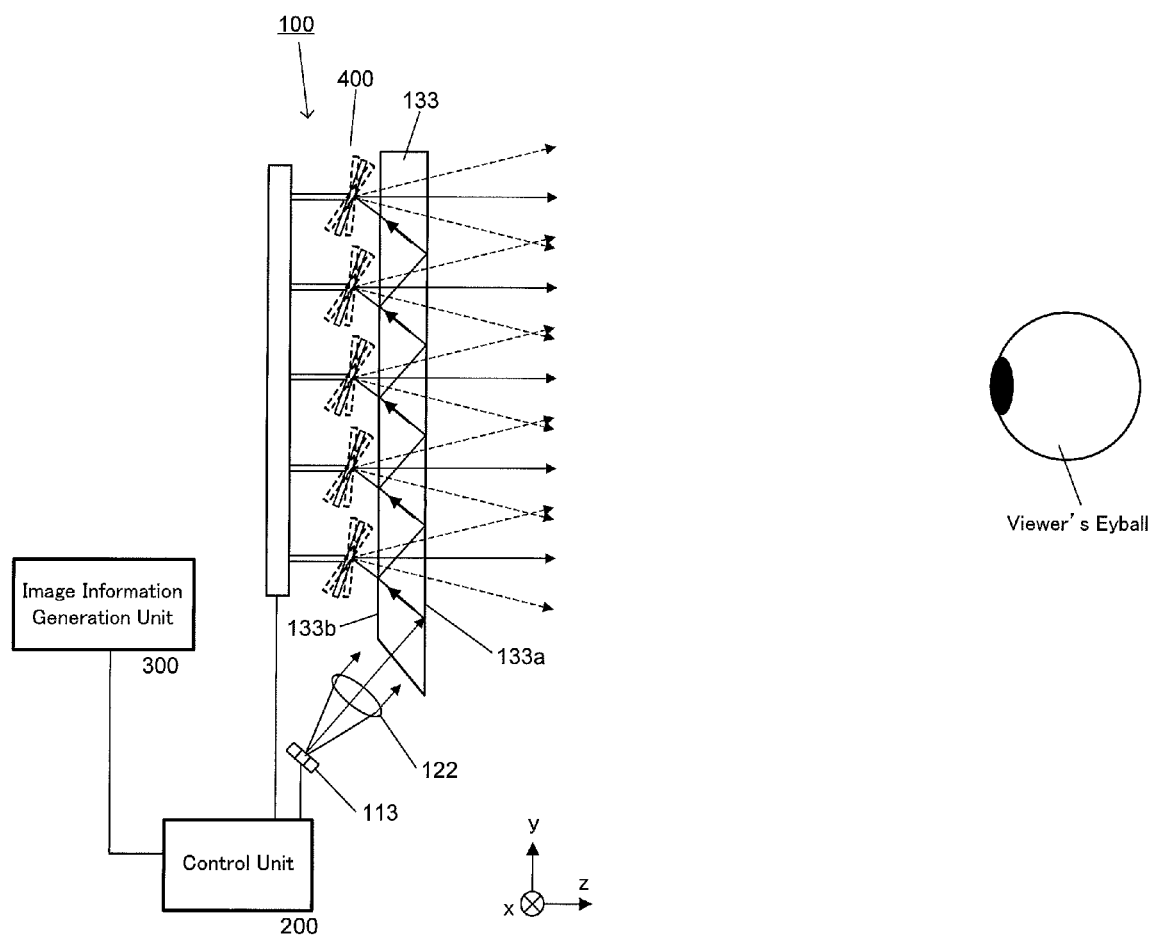
FIG. 7 is a sectional view of the arrangement of the image display apparatus according to the third embodiment of the invention.
Figure 8:
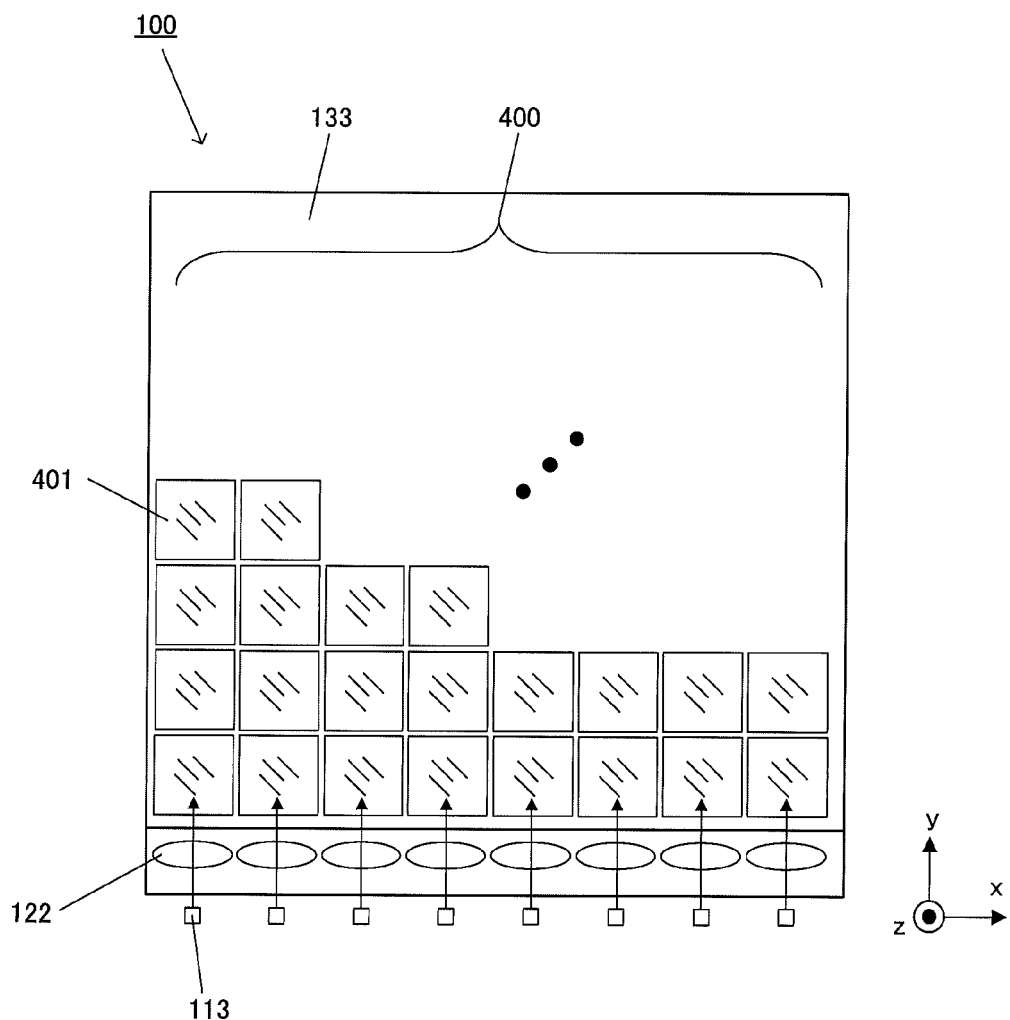
FIG. 8 is a front view of the arrangement of the image display apparatus according to the third embodiment of the invention.

FIGS. 7 and 8 are a sectional view and a front view of the image display apparatus according to the third embodiment of the invention, respectively. The third embodiment of the invention is primarily different from the aforesaid first and second embodiments in terms of how to deflect light, viz., in that an MEMS mirror array 400 is used as the light deflector.

The image display apparatus according to the third embodiment of the invention includes and comprises a light guide 133, the MEMS mirror array 400, an LED 113, and a collimator lens 122. The MEMS mirror array 400 includes a plurality of MEMS mirrors 401 arranged in the xy plane. The LED 113 and collimator lens 122 form together a light source capable of emitting out parallel light. As is the case with the second embodiment of the invention, the LED 113 may be designed to emit out light in plural colors thereby forming color images. A plurality of light sources, each comprising the LED 113 and collimator lens 122, may be arranged in the x-axis direction as shown in FIG. 8, thereby making the display screen wider.

Figure 9:
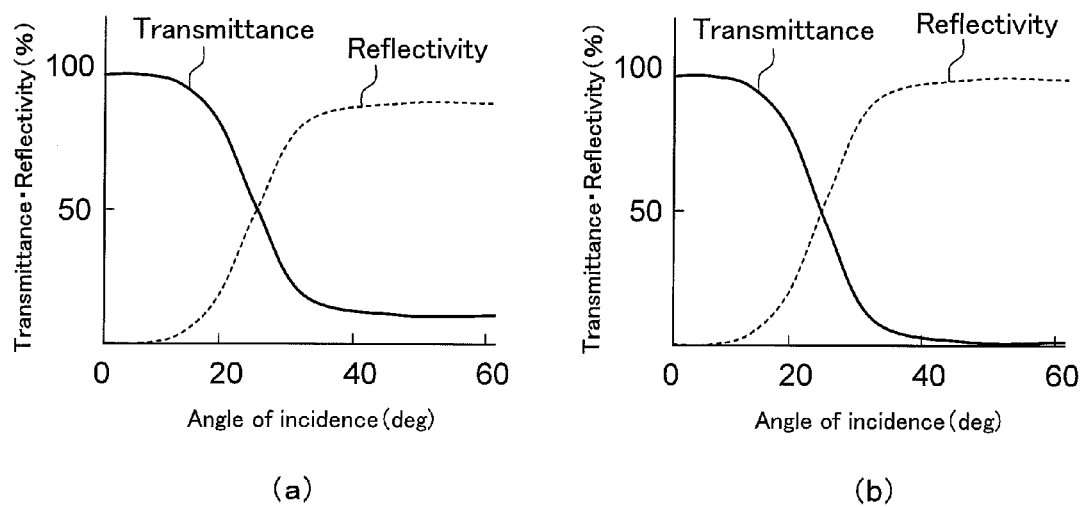
FIG. 9 shows the transmittance and reflectivity characteristics of both surfaces of the light guide 133 used in the third embodiment of the invention.

Light emitted out from the LED 113 is transformed through the collimator lens 122 into parallel light that in turn enters and propagates through the light guide 133 while being reflected inside. The transmittance and reflectivity characteristics of the surfaces 133a and 113b of the light guide 133 facing to the viewer side and the MEMS mirror array 400 side are shown in FIGS. 9(a) and 9(b), respectively. Both the surfaces 133a and 133b have a transmittance of approximately 100% for light rays having a small angle of incidence, viz., light rays incident almost vertically on them. On the other hand, this light guide can have a much higher reflectivity for light rays having a certain angle of incidence. Parallel light guided making use of such surface nature is reflected at the respective MEMS mirrors 401, and transmits through the light guide 133, going out to the viewer side.

In the third embodiment of the invention, the MEMS mirrors 401 are capable of rotating about the x-axis as well as the y-axis, so that scan can take place while deflecting the incident parallel light in the x-axis direction as well as in the y-axis direction. The respective MEMS mirrors 401 are all controlled in such a way as to be oriented in the same direction, and the parallel light going out to the viewer side is deflected in the same direction.

The control unit 200 controls the direction of rotation of the respective MEMS mirrors 401 to control the direction of deflection of the incident parallel light for scanning, and enables the LED 113 to emit out light on the basis of image information entered from the image information generation unit 400, permitting the viewer to view images.

(Fourth Embodiment)

Figure 10:
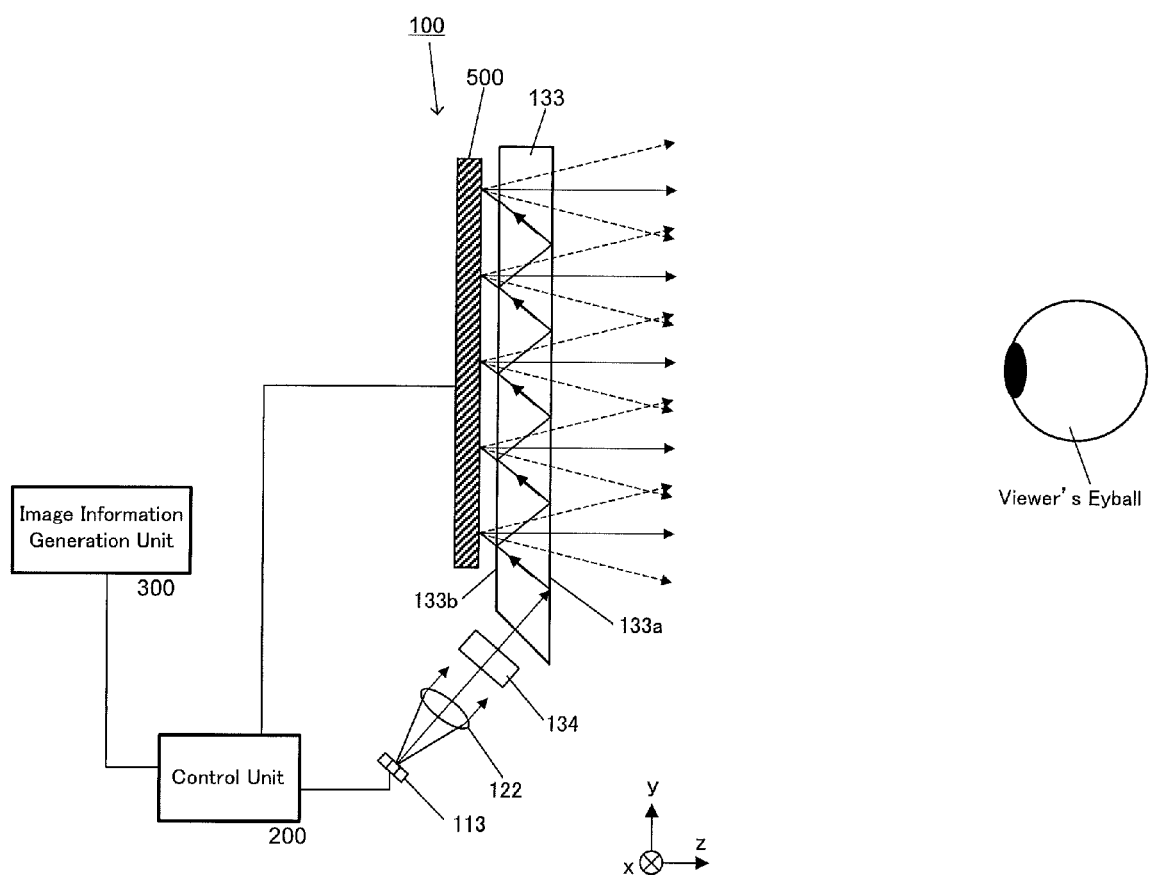
FIG. 10 is a sectional view of the arrangement of the image display apparatus according to the fourth embodiment of the invention.
Figure 11:
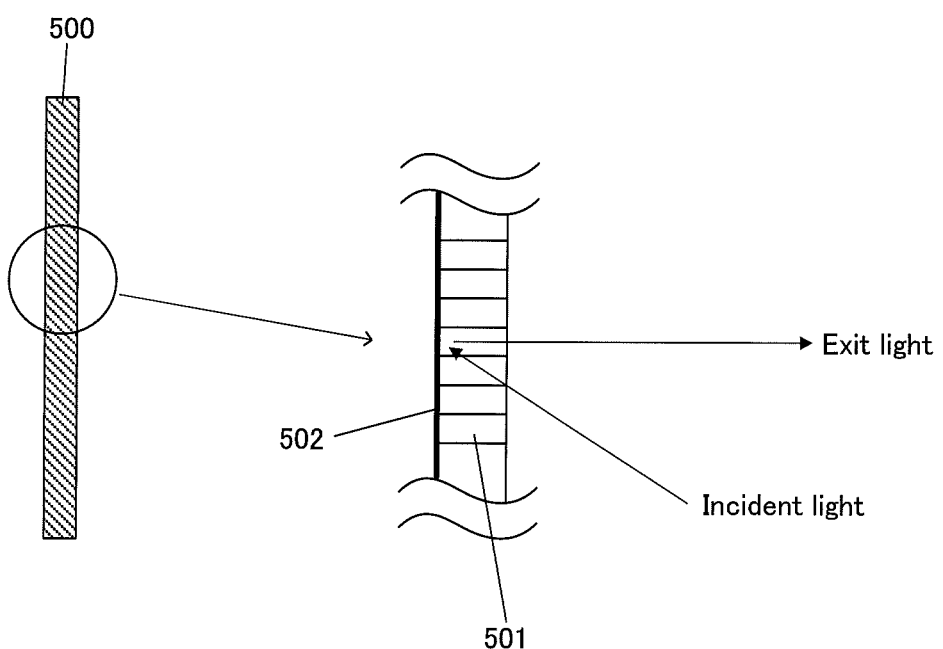
FIG. 11 illustrates the phase modulation type LCOS used in the fourth embodiment on an enlarged scale.
Figure 12:
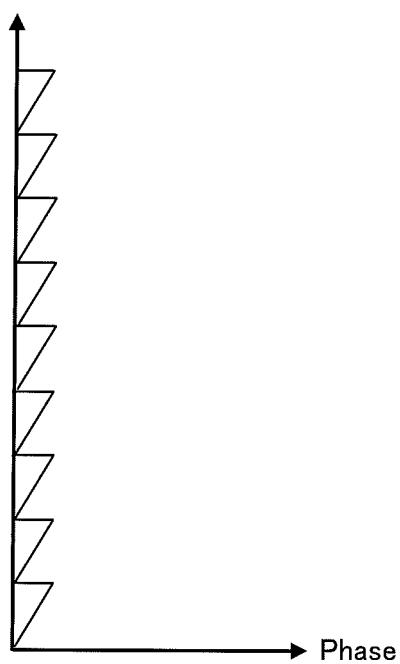
FIG. 12 shows the phase characteristics of the phase modulation type LCOS used in the fourth embodiment.

The fourth embodiment of the invention is now explained with reference to FIGS. 10, 11 and 12. The fourth embodiment is different from the third embodiment in that instead of the MEMS mirror array 310, a phase modulation type LCOS (liquid crystal on silicon) is used as the light deflector. Otherwise, this arrangement is much the same as the arrangement of the third embodiment including the light guide 133. In what follows, therefore, the function of the phase modulation type LCOS 500 as the light deflector will be explained.

The phase modulation type LCOS 500 is an optical device which comprises an array of cells, each having a variably controllable phase, and in which the amount of that phase can be modulated to deflect the incident light. FIG. 11 is a fragmentally enlarged view of the phase modulation type LCOS 500. As shown, the phase modulation type LCOS 500 includes and comprises a plurality of phase modulation liquid crystal cells 501 in an array configuration, and each phase modulation liquid crystal cell 501 is controlled in such a way as to have such a serrated phase as typically shown in FIG. 12. The incident light is deflected depending on the amount of phase, exiting out from the cell 501. The direction of deflection may be adjusted by increasing or decreasing the tilt of amount of the serrated phase.

As described above, the phase modulation type LCOS 500 is capable of implementing deflection as is the case with the aforesaid third embodiment of the invention. The control unit 200 controls the direction of deflection of parallel light incident from the light guide 133, and adjusts the intensity of light of the LED 113, allowing the viewer to view virtual images. In order that the phase modulation type LCOS 500 used in the fourth embodiment functions properly, it is required to enter a linearly polarized light beam in the phase modulation type LCOS 500. It is then preferable to insert a polarization conversion element 134 for transforming a direction of polarization into a linear one in an optical path taken between the light source and the phase modulation type LCOS 500.

While some embodiments according to a certain aspect of the invention have been explained, it is to be understood that if the image display apparatus according to the aforesaid embodiments are modified such that images are projected in the distance, it is possible for even farsighted viewers to view virtual images. It is noted, however, that when such image display apparatus are applied to nearsighted viewers, it is sometimes difficult to bring images projected in the distance into focus.

Figure 13:
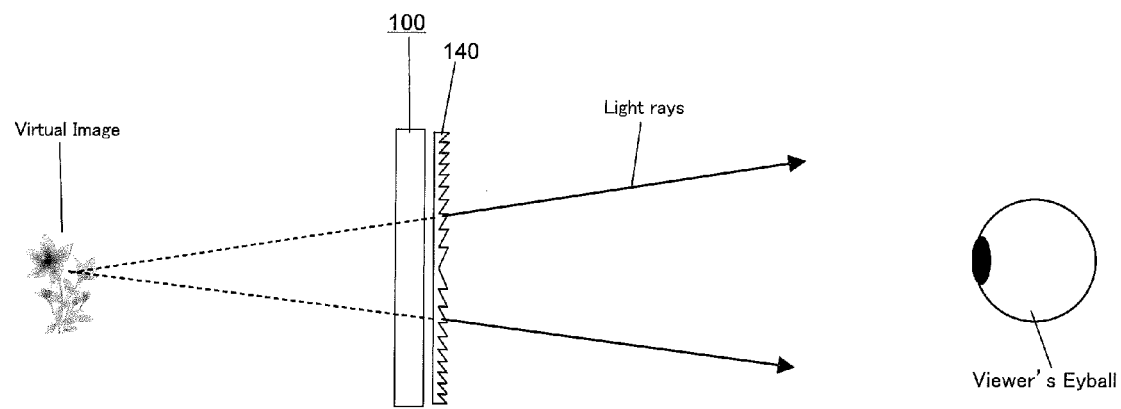
FIG. 13 is illustrative of the image display apparatus according to an embodiment with a Fresnel lens provided in it.

In such a case, a regulating optical device may further be located on the display surface of the aforesaid image display apparatus 100. FIG. 13 is illustrative of an exemplary form in which a Fresnel lens 140 is located as the regulating optical device on the viewer side of the image display apparatus 100 according to the aforesaid embodiments.

For instance, when the Fresnel lens 140 having a focal length of −750 nm is located to view a virtual image at a 250 nm away distance, that virtual image can be viewed at a distance 1,000 mm (1 m) away from the viewer. This means that the viewer is going to view an image 1 m ahead: even a nearsighted viewer can bring the image into focus to view it more clearly.

The Fresnel lens 140 having a positive focal length may be used for a farsighted viewer. While the Fresnel lens 140 is here exemplified as the regulating optical device, it is to be understood that any optical device having a negative or positive optical focal length may be used to achieve similar functions. Preferably, such a regulating optical device should be provided as an attachment piece attachable to or detachable from the image display apparatus 100. Attachment, detachment, and deflection may be carried out depending on the visual acuity of the viewer.

While some embodiments according to a certain aspect of the invention have been described above, it is to be understood that the invention is not limited to them, and some combinations of these embodiments are included in the category of the invention too.

What is claimed is:

1. An image display apparatus characterized by comprising:
    a light source for emitting out parallel light,
    a light deflector capable of deflecting the parallel light emitted out from said light source,
    a control unit operable to produce a scan signal for deflecting said light deflector periodically, and produce a light intensity control signal in sync with said scan signal based on entered image information thereby controlling said light source, and
    a light guide for guiding parallel light emitted out from said light source into said light deflector, wherein said light guide comprises two mutually opposed surfaces, said two surfaces being reflecting surfaces that alternately reflect parallel light emitted out of said light source plural times for propagation of said parallel light between them, wherein either one of said two surfaces forming said light guide is an exit surface from which a part of said parallel light exits toward a direction in which said light deflector is located, and wherein said two surfaces are each a transmitting surface for transmitting light deflected by said light deflector.

2. The image display apparatus as recited in claim 1, characterized in that a plurality of said light deflectors are arranged within a plane that defines a viewer's field of view.

3. The image display apparatus as recited in claim 1, characterized in that said control unit produces a multistage light intensity control signal, and said light source emits out parallel light having a light intensity depending on said light intensity control signal.

4. The image display apparatus as recited in claim 1, characterized in that said light source comprises a diffuse light emitting source for emitting out diffuse light, and an optical transformation device for transforming said diffuse light into parallel light.

5. The image display apparatus as recited in claim 4, characterized in that said diffuse light emitting source is either a semiconductor laser or an LED.

6. The image display apparatus as recited in claim 1, wherein said light source is capable of emitting out parallel light having a plurality of wavelength bands.

7. The image display apparatus as recited in claim 6, characterized in that said light source comprises a plurality of diffuse light emitting sources for emitting out diffuse light having different wavelength bands, and an optical transformation device for transforming said diffuse light into parallel light, wherein said control unit is operable to enable any one of said diffuse light emitting sources in said light source to emit out light, and produce a scan signal that deflects said light deflector at a deflection angle depending on said diffuse light emitting source that is emitting out light.

8. The image display apparatus as recited in claim 1, wherein said light deflector is a phase-modulated LCOS.

9. The image display apparatus as recited in claim 1, wherein said light deflector is an MEMS mirror array.

\* \* \* \* \*